United States Patent [19]

Jones

[11] Patent Number: 5,680,539

[45] Date of Patent: Oct. 21, 1997

[54] DISK ARRAY SYSTEM WHICH PERFORMS DATA RECONSTRUCTION WITH DYNAMIC LOAD BALANCING AND USER-SPECIFIED DISK ARRAY BANDWIDTH FOR RECONSTRUCTION OPERATION TO MAINTAIN PREDICTABLE DEGRADATION

[75] Inventor: Craig Jones, Lago Vista, Tex.

[73] Assignee: Dell USA, L.P., Round Rock, Tex.

[21] Appl. No.: 500,760

[22] Filed: Jul. 11, 1995

[51] Int. Cl.$^6$ .................. G06F 11/00; G06F 11/16; G06F 11/08

[52] U.S. Cl. ............... 395/182.04; 395/441; 395/182.04; 395/404; 395/405; 371/10.2

[58] Field of Search ................... 395/441, 182.04, 395/404, 405; 371/10.2

[56] References Cited

U.S. PATENT DOCUMENTS

| | | | |
|---|---|---|---|
| 5,072,368 | 12/1991 | Foreman et al. | 395/182.04 |
| 5,278,838 | 1/1994 | Ng et al. | 395/182.04 |
| 5,446,855 | 8/1995 | Dang et al. | 395/401 |
| 5,537,566 | 7/1996 | Konno et al. | 395/441 |
| 5,542,062 | 7/1996 | Tanaka et al. | 395/441 |

Primary Examiner—Robert W. Beausoliel, Jr.
Assistant Examiner—Luan Cao Do
Attorney, Agent, or Firm—Skjerven, Morrill, MacPherson, Franklin & Friel L.L.P.; Stephen A. Terrile

[57] ABSTRACT

A disk controller and method which dynamically compensates for host command queue depth during the data rebuild process and thus maintains a predictable level of performance during data reconstruction operations. During non-idle periods, a rebuild task monitors the current host command queue depth generated by the host and submits additional rebuild requests accordingly. Rebuild requests are preferably sized based on the current rebuild queue depth and the user-selected performance allotment for rebuild operations to maintain a predictable level of performance degradation. Therefore, the rebuild task dynamically compensates for host command queue depth by queueing an appropriate number of rebuild requests of varying size so that neither requesting task dominates. This compensates for instances when the host queues requests deeply, such as during write cache flushing, while also preserving responsiveness when the host has one single thread of activity. In an alternate embodiment, the disk controller includes a first queue which is relatively deep and a second intermediate queue which is relatively shallow. Host requests are queued into the first queue and are then filtered into the intermediate queue. The rebuild task queues rebuild requests directly into the intermediate level queue, whose command queue depth is limited to very few requests. In this embodiment, the variation in command queue depth due to host requests is filtered out and by the first queue, and performance degradation is controlled more consistently.

23 Claims, 5 Drawing Sheets

DISK ARRAY SYSTEM WHICH PERFORMS DATA RECONSTRUCTION WITH DYNAMIC LOAD BALANCING AND USER-SPECIFIED DISK ARRAY BANDWIDTH FOR RECONSTRUCTION OPERATION TO MAINTAIN PREDICTABLE DEGRADATION

FIELD OF THE INVENTION

The present invention relates to disk array systems in computer systems, and more particularly to a disk controller and method which performs data reconstruction on a drive in a disk array system using dynamic load balancing techniques to maintain a predictable level of degradation.

DESCRIPTION OF THE RELATED ART

Modern computer systems require increasingly greater amounts of memory and storage capabilities. This is particularly true in network server applications where a single computer referred to as a file server stores files for a number of users in a local area network (LAN). In a typical file server, the storage needs typically exceed the capacity of current hard disks, and thus most file servers require multiple disks to provide the necessary storage capacity. A typical disk drive storage configuration uses a redundant array of inexpensive disks, referred to as a RAID configuration, whereby the drives are linked together through hardware to form a drive array. In this manner, a number of individual hard disks are combined to create a massive virtual system. The drives in the array are coordinated with each other and information is allocated between them.

In a typical RAID configuration data is split between the drives at the bit, byte or block level. For example, in a four drive system two bits of every byte might come from the first hard disk, the next two bits from the second hard disk, and so on. The four drives then output a single byte data stream four times faster than a serial drive implementation, i.e., transferring all the information comprised in a byte takes only as long as required for a single drive to transfer two bits. This technique of splitting data between several drives is referred to as data striping. Operating multiple individual disks together as an array allows for higher speeds, improved reliability, and greater resistance to errors than can be achieved by operating each disk independently.

One possible drawback to data striping is that the failure of any drive in the system results in the complete failure of the entire system. Therefore, various methods have been developed to use a portion of the capacity of the drive array to yield more reliable and fault-tolerant storage systems. This increased reliability and fault-tolerance is achieved through various redundancy measures, including mirroring and parity implementations. Currently, five levels of RAID technology are now recognized. Each of these implementations has various tradeoffs regarding efficient use of drive capacity, fewest number of drives, greatest reliability, and best performance.

RAID 1 is the simplest drive array implementation and simply comprises two equal capacity disks that mirror each other. One disk duplicates all the files of the other, essentially serving as a backup copy. RAID 2 interleaves bits or bytes of data, i.e., implements data striping as explained above, and uses one or more redundant disks to correct single bit errors and detect double bit errors. The number of extra disks required depends upon the particular error correction algorithm used. RAID 3 implements data striping and includes one or more extra drives for parity checking. It is important to note that RAID 3 only provides for parity checking and does not include any provision for error correction, i.e., errors can be detected without any guarantee of recovery. Parity checking typically requires fewer extra drives than the other RAID implementations, typically only one extra drive per array. RAID 4 interleaves sectors of data, not bits or bytes. In addition, the sectors are read serially as if the drives in the array were functionally one large drive with more heads and platters. One drive in the array is dedicated to parity checking for reliability. The RAID 4 implementation offers the advantage that operating systems can process multiple data requests simultaneously and further can receive and reorganize requests to perform them in the most efficient manner. In the RAID 5 implementation, the disk array does not include a single dedicated parity drive as in RAID 4, but rather the parity check function is rotated throughout the various drives in the array. In this manner, error checking is distributed across all of the disks in the array. RAID 4 can be considered a degenerate form of RAID 5, i.e., once disk array controller logic has been developed to implement a RAID 5 array, a RAID 4 array can be implemented by simply disabling the logic which distributes parity across the disks in the array. In addition to the five levels of RAID technology discussed above, the term "RAID 0" is often used to refer to a number of disk drives that are data striped but have no form of redundancy.

RAID disk subsystems are used in environments where performance and data availability are critical. Data redundancy is used to provide high data availability and prevent one disk failure from incapacitating the entire array. When a drive failure occurs in a drive array using a RAID configuration, there is typically sufficient redundancy remaining to reconstruct the lost data. In many drive array systems, an intelligent controller reconstructs the lost data as necessary until a replacement drive is installed. In other words, during the time between the failure of a drive and its replacement with a new drive, the data on the failed drive is automatically generated using the other drives and the redundancy drive, and thus the drive array behaves as if the drive failure has not occurred.

When the replacement drive is installed, the disk controller reconstructs the "lost" data onto the replacement drive using the data from the remaining drives and the redundancy data. In other words, when a defective drive in the redundant disk array is replaced with a new drive, the controller reconstructs the appropriate data on the new disk. The data is reconstructed so that, after the reconstruction process has completed, reading any block of data through all possible data paths produces the same result.

In some prior art systems, including the Dell Drive Array (DDA) and the Dell SCSI Array (DSA), the data reconstruction process is performed by an independent software task, referred to as the rebuild task or the utility task. The data reconstruction process occurs while the disk array is on-line servicing host requests, and thus the rebuild task competes with the host in requesting disk I/O. In intelligent disk array systems, including the DDA and DSA systems mentioned above, the rebuild task attempts to regulate its own I/O profile in response to host demands to ensure that the rebuild process does not result in unacceptable performance degradation.

In some prior art systems, the disk controller architecture allows the user to specify the amount of disk array bandwidth to be used by the controller for the reconstruction process. This specified amount of disk array bandwidth also determines the maximum degradation acceptable to the user's application. If the data reconstruction process consumes a greater amount of disk array resources than that specified by the user and thus exceeds the acceptable level of degradation, this could be considered a failure of the system. This is especially true in applications such as multimedia applications which require real time, high speed data transfers from the disk array subsystem to other components in the computer system. Therefore, data reconstruction which exceeds an acceptable level of degradation is problematic. In addition, a fundamental assumption of RAID configurations is that redundancy is maintained at all times. Therefore, it is highly desirable that the disk controller provide a guaranteed completion time for the rebuild process while also maintaining a predictable performance degradation to the system.

U.S. Pat. No. 5,313,626 titled "Disk Drive Array with Efficient Background Rebuilding" and whose inventor is Craig Jones, describes a disk controller which is designed to make a certain amount of progress on the rebuild operation each second. This disk controller is used in the DDA and DSA disk systems mentioned above. The disk controller detects drive idle periods and uses these idle periods to reconstruct data in spurts. The disk controller creates and submits low priority requests during idle periods so that any host request comes in at a higher priority. Thus, during idle periods, new host requests immediately bypass the low priority rebuild requests in the queue. If no idle period has occurred for a period of time and the host continues to submit requests to the disk array, the rebuild task eventually forces one or more rebuild requests to be performed by elevating their priority to take precedence over host requests.

The systems mentioned above insert rebuild requests during non-idle periods, wherein the number and size of rebuild requests are calibrated to a presumed constant host command queue depth to attempt to maintain a predictable level of degradation. This technique generally works well presuming a constant host command queue depth. However, the host typically exhibits a varying queue depth under load, i.e., during host disk accesses. When the command queue depth varies, this alters the calibration and causes the predicted degradation to be incorrect. As a result, the maximum performance degradation cannot be guaranteed when a constant host command queue depth is presumed.

For example, the disk controller described above in U.S. Pat. No. 5,313,626 only detects drive idle periods when the host has ceased providing requests to the disk controller for a period of time and the disk controller actually goes idle. When the host provides requests to the disk controller one at a time, the rebuild task presumes that the disk controller has a saturated load even though the queue is relatively empty and the host is only providing requests one at a time. After a period of time, the rebuild task submits one or more rebuild requests of a very high priority to ensure that these rebuild requests are performed. As mentioned above, the number of high priority disk requests is calibrated to a presumed constant host command queue depth. However, if the host requests that are being provided one at a time are relatively small requests, such as 4 kilobyte requests, then the actual host queue depth may be much smaller than the presumed constant queue depth. Thus, the higher priority rebuild requests may result in the host having much less than the user specified bandwidth. For example, if the user has requested a minimum host bandwidth of fifty percent, the higher priority requests may result in the host having only ten percent of disk bandwidth.

In certain disk operations such as installation of a disk, adding a new drive, repartitioning a drive, performing a disk scan, etc., this increased performance degradation can slow disk subsystem operation considerably. In some environments, the increased performance degradation can actually result in a system failure, because, since a task is being performed so slowly, the operating presumes that a failure has occurred.

Conversely, if the host has provided a large number of requests to the disk controller, then the actual host queue depth may be much greater than the presumed constant queue depth. In this instance, the rebuild task may not have sufficient bandwidth to perform the rebuild in the desired amount of time, i.e., the rebuild may take much longer to complete. As a result, the disk controller cannot guarantee a completion time, and thus redundancy is not maintained for an indeterminate amount of time.

Therefore, a system which detects only between idle and non-idle periods cannot accurately determine the varying host load and/or varying host command queue depth. As a result, the rebuild task may inadvertently either exceed the maximum performance degradation or fail to complete the rebuild in the desired amount of time. Therefore, a disk controller and method is desired which performs data reconstruction operations in a guaranteed completion time while maintaining a predictable level of degradation.

SUMMARY OF THE INVENTION

The present invention comprises a disk controller and method which dynamically compensates for host command queue depth during the data rebuild process and thus maintains a predictable level of performance during data reconstruction operations. During non-idle periods, a Host Queue Depth Monitor executing in conjunction with the Rebuild Task monitors the current host command queue depth generated by the host and increases or decreases a Desired Rebuild Queue Depth variable accordingly. If the host queue depth is increasing, the Host Queue Depth Monitor increases the Desired Rebuild Queue Depth variable proportionately. Conversely, if the host queue depth is decreasing, the Host Queue Depth Monitor decreases the Desired Rebuild Queue Depth variable proportionately. The Host Queue Depth Monitor task preferably periodically executes based on a timer and/or after each rebuild request completes.

The Rebuild Task examines the Desired Rebuild Queue Depth variable and compares this variable with the actual rebuild queue depth. If the actual rebuild queue depth differs from the Desired Rebuild Queue Depth, the Rebuild Task submits additional rebuild requests until the rebuild queue depth equals or is a desired proportion of the Desired Rebuild Queue Depth. Rebuild requests are preferably sized based on the current rebuild queue depth and a user-selected performance allotment for rebuild operations to maintain a predictable level of performance degradation. Therefore, the Rebuild Task queues an appropriate number of rebuild requests of varying size so that neither requesting task dominates. This compensates for instances when the host queues requests deeply, such as during write cache flushing, while also preserving responsiveness when the host has one single thread of activity.

In an alternate embodiment of the invention, the disk controller includes a first queue which is relatively deep and a second intermediate queue which is relatively shallow. Host requests are queued into the first queue and are then filtered into the intermediate queue before execution. The Rebuild Task queues rebuild requests directly into the intermediate level queue, whose command queue depth is limited to very few requests. In this embodiment, the variation in command queue depth due to host requests is filtered out by the first queue, and thus performance degradation is consistently controlled. In one embodiment, the Rebuild Task comprises part of the task which processes the request queue itself, and thus no special software is required to compensate for queue depth or to synchronize access to the second level queue.

Therefore, the present invention comprises a disk controller and method which dynamically compensates for the host command queue depth during data reconstruction operations. The disk controller thus maintains a predictable level of degradation during reconstruction operations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. Pat. No. 5,313,626 titled "Disk Drive Array with Efficient Background Rebuilding," whose inventor is Craig Jones, is hereby incorporated by reference in its entirety.

Computer System Block Diagram

Figure 1:
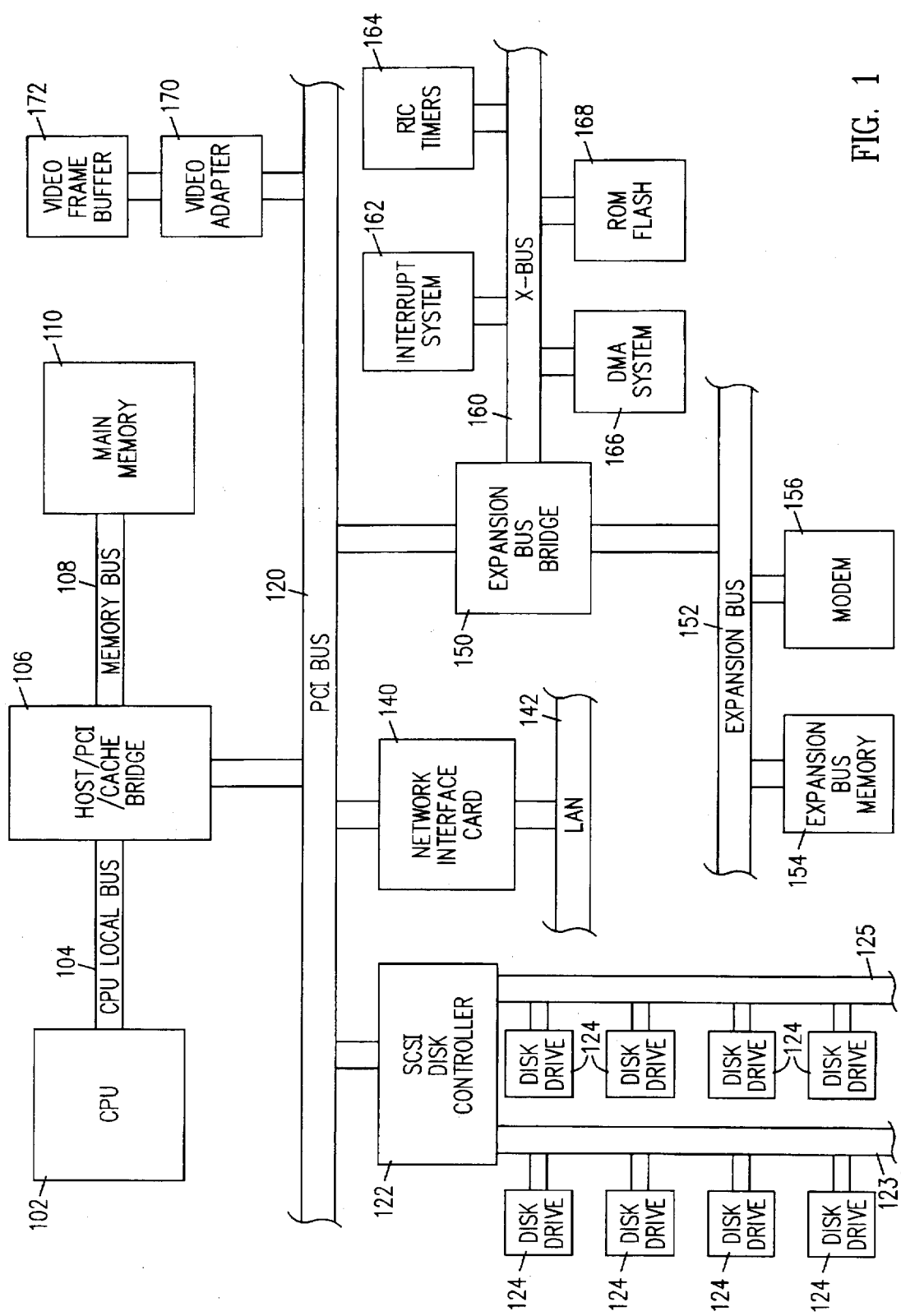
FIG. 1 is a block diagram of a computer system incorporating a disk array system of the present invention.

Referring now to FIG. 1, a block diagram of a computer system incorporating a disk subsystem and including the preferred embodiment of the present invention is shown. It is noted that the present invention may be incorporated into any of various types of computer systems. As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Various types of devices may be connected to the PCI bus 120. In the embodiment shown in FIG. 1, a video adapter 170 and video frame buffer 172 are coupled to the PCI bus 120 for controlling video functions. A disk controller 122, preferably a SCSI (small computer systems interface) disk controller 122, is coupled to the PCI bus 120. The disk controller 122 performs data reconstruction operations with dynamic load balancing according to the present invention, as discussed below. The SCSI disk controller 122 includes two SCSI channels 123 and 125. Each of these SCSI channels 123 and 125 include eight disk drive units 124 forming a disk array. The disk array system is shown separately in FIG. 2. It is noted that other devices may be connected to the SCSI channels 123 and 125, as desired. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

Disk Array System

Figure 2:
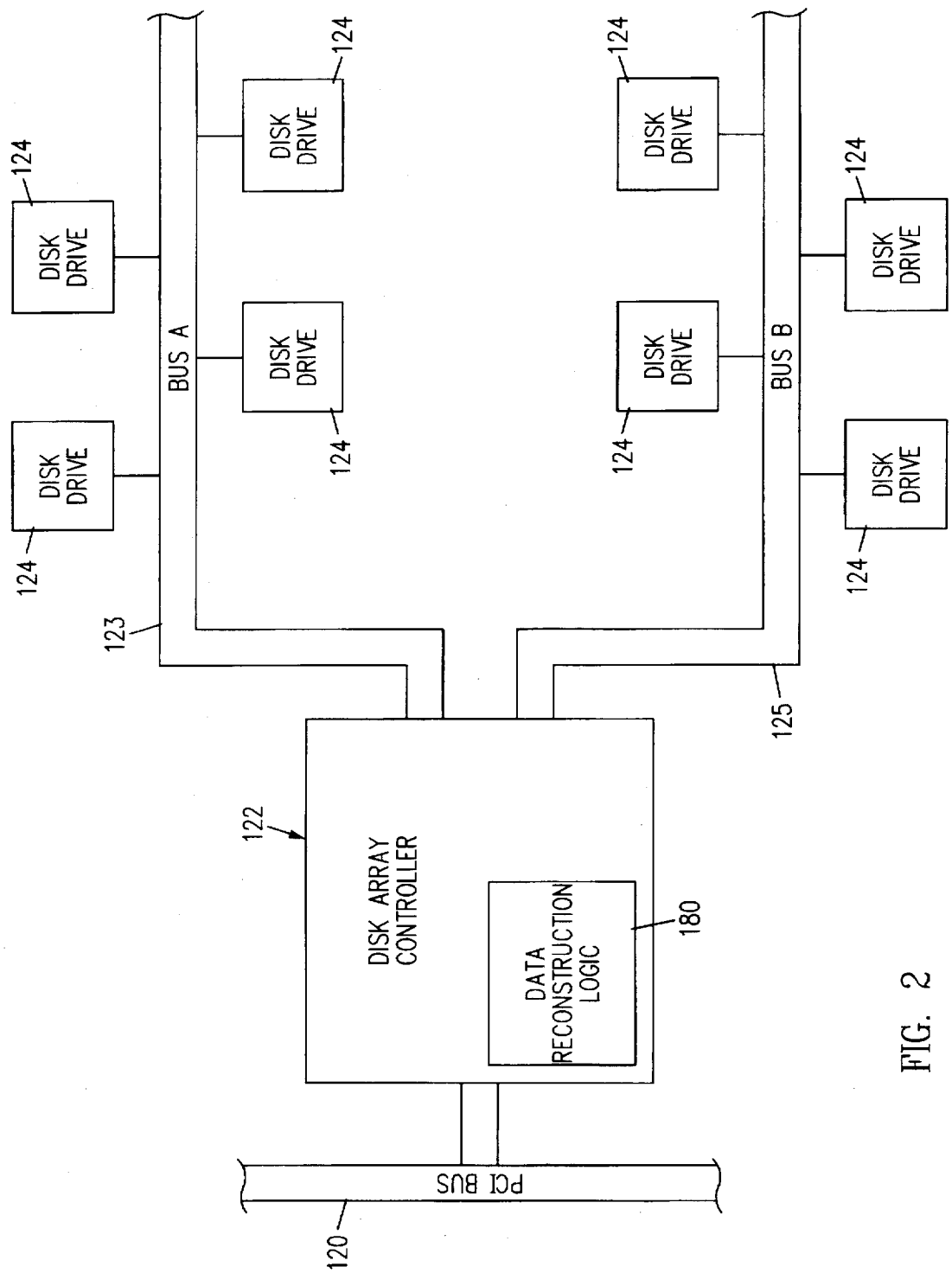
FIG. 2 illustrates the disk array system shown in FIG. 1.

Referring now to FIG. 2, the disk array controller 122 and disk drives 124 comprising the disk array are shown. The disk array controller 122 preferably includes logic to control operations on two buses 123 and 125, preferably SCSI buses as discussed above. In the preferred embodiment, four disk drives 124 are connected to each of the SCSI buses 123 and 125. As shown, the disk array controller 122 includes disk drive data reconstruction logic 180 which reconstructs or rebuilds data on one or more new drives when one or more defective drives is replaced. The reconstruction logic 180 dynamically compensates for host command queue depth during the rebuild process to maintain predictable performance during the rebuild process under a wide variety of disk loads.

Disk Controller

Figure 3:
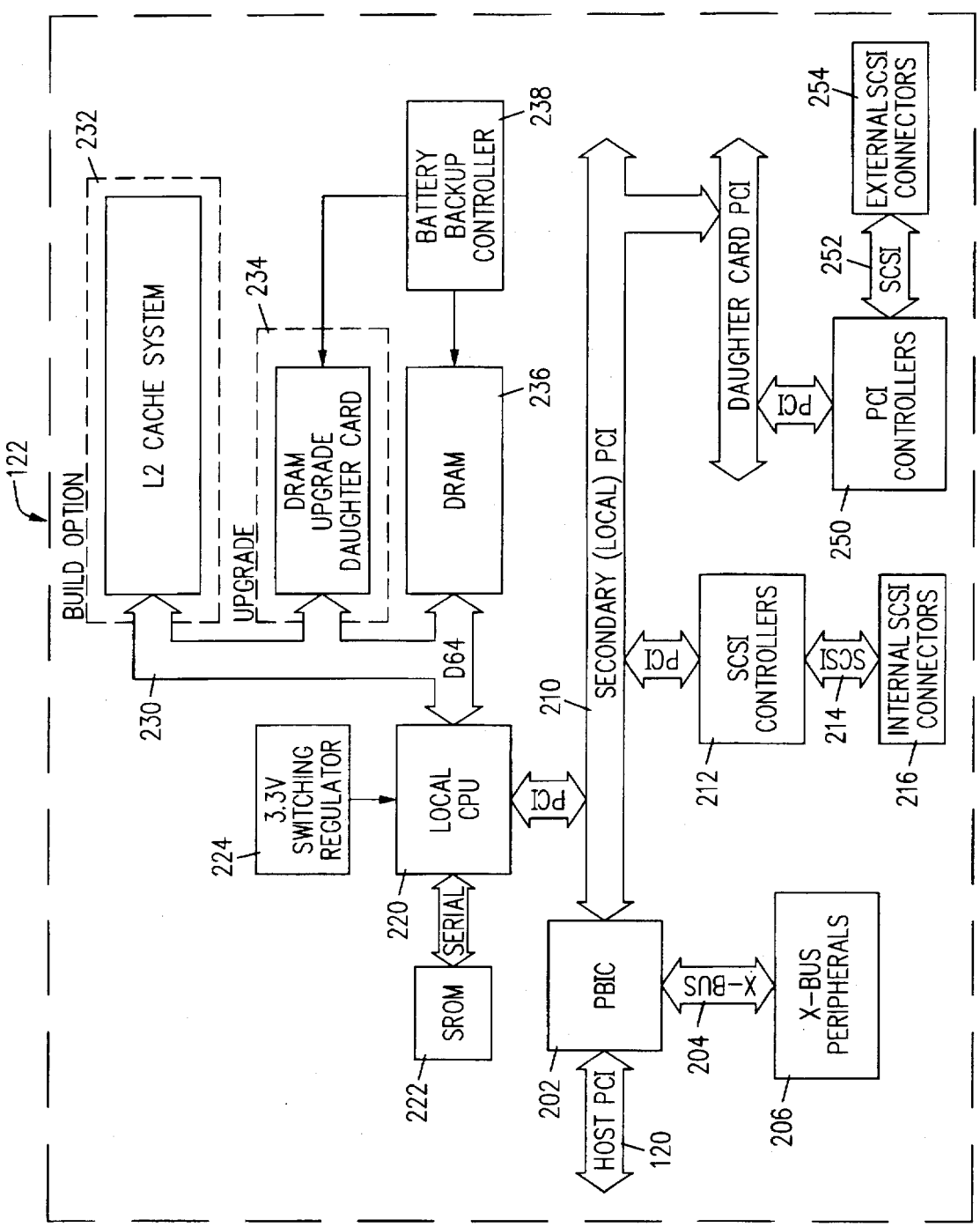
FIG. 3 is a more detailed block diagram of the SCSI disk controller of FIGS. 1 and 2.

Referring now to FIG. 3, a block diagram illustrating the SCSI disk controller 122 in FIG. 1 is shown. As shown, the SCSI disk controller 122 includes a PCI bus interface chip (PBIC) 202, which couples to the host or primary PCI bus 120. The PBIC 202 interfaces through a second X-bus 204 to various X-bus peripherals 206 as shown. The various X-bus peripherals 206 preferably include a DMA system, interrupt system, timers, a real time clock (RTC). configuration ports, diagnostic ports, command/status registers, ROM/Flash memory, and non-volatile SRAM (NVSRAM) (all not shown).

The PBIC 202 also couples to a secondary PCI bus 210. SCSI controllers 212 are coupled to the secondary PCI bus 210. The SCSI controllers 212 in turn couple through a SCSI bus 214 to internal SCSI connectors 216. In the preferred embodiment, two SCSI controllers are incorporated into block 212, and the SCSI bus 214 comprises the two SCSI channels 123 and 125. The internal SCSI connectors 216 are for attaching the various devices, such as the disk drives 124, as shown in FIGS. 1 and 2.

A local CPU 220 is coupled to the secondary PCI bus 210. The local CPU 220 may be any of various types. In the preferred embodiment, the local CPU 220 is the PowerPC microprocessor produced by Motorola and IBM. In an alternate embodiment, the local CPU 220 is the Alpha chip from Digital Equipment Corporation (DEC). The local CPU 220 couples through a serial bus to an SROM 222. The local CPU 220 receives power from a 3.3 V switching regulator 224, as shown. The local CPU 220 includes a 64 bit data path which couples through a 64-bit data bus 230. Dynamic random access memory (DRAM) 236 is coupled to the 64-bit data bus 230. The local CPU 220 executes software stored in the DRAM 236, including a Rebuild Task and a Host Queue Depth Monitor, to perform data reconstruction operations according to the present invention.

The 64-bit data bus 230 includes a connection for coupling to an optional dynamic random access memory (DRAM) upgrade daughter card 234. An optional second level or L2 cache system 232 may also be coupled to the 64-bit data bus 230. The DRAM upgrade daughter card 234 and the L2 cache system 232 are shown in dotted lines and are options that are included in the preferred embodiment, but may be left out as desired. A battery backup controller 238 is coupled to each of the DRAM 236 and the DRAM upgrade daughter card 234. The local PCI bus 210 also includes a daughter card option for additional SCSI connections. As shown, additional PCI controllers 250 may be coupled to the local PCI bus 210 through a daughter card PCI bus as shown. The PCI controllers 250 couple through additional SCSI channels 252 to respective external SCSI connectors 254, as shown.

Execution Queue

Figure 4:
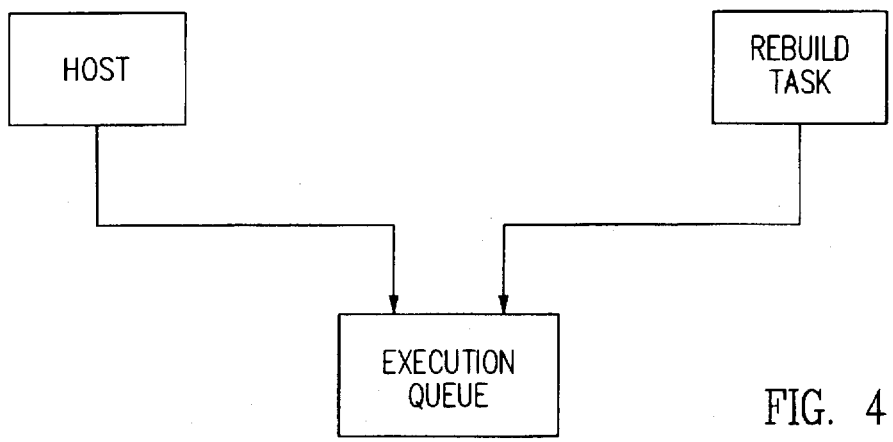
FIG. 4 illustrates the relationship of the host and the rebuild task submitting requests to the execution queue according to one embodiment of the invention.

Referring now to FIG. 4, the relationship of the host, i.e., the CPU 102, and the Rebuild Task in placing requests within the execution queue of the disk controller 122 is shown. In the present disclosure, the term request is used to refer to both read and write requests to the disk array. As shown, both the host and the Rebuild Task place requests into the execution queue for execution by the disk controller 122. According to the present invention, the Rebuild Task monitors the host command queue depth, i.e., the number of host command requests in the execution queue, and maintains a similar number of rebuild requests in the execution queue. Thus, the Rebuild Task dynamically compensates for the host command queue depth during the rebuild process. When the host has issued and queued a small number of requests, the Rebuild Task issues a correspondingly small number of rebuild requests, so that neither requesting task dominates. When the host has issued a heavy load of requests, the Rebuild Task queues a similarly large number of rebuild requests of varying size, again so that neither requesting task dominates. This compensates for times when the host queues requests deeply, such as during write cache flushing periods, while also preserving disk array responsiveness when the host has only a single threaded activity, such as a drive format or mount.

Host Queue Depth Monitor

Figure 5:
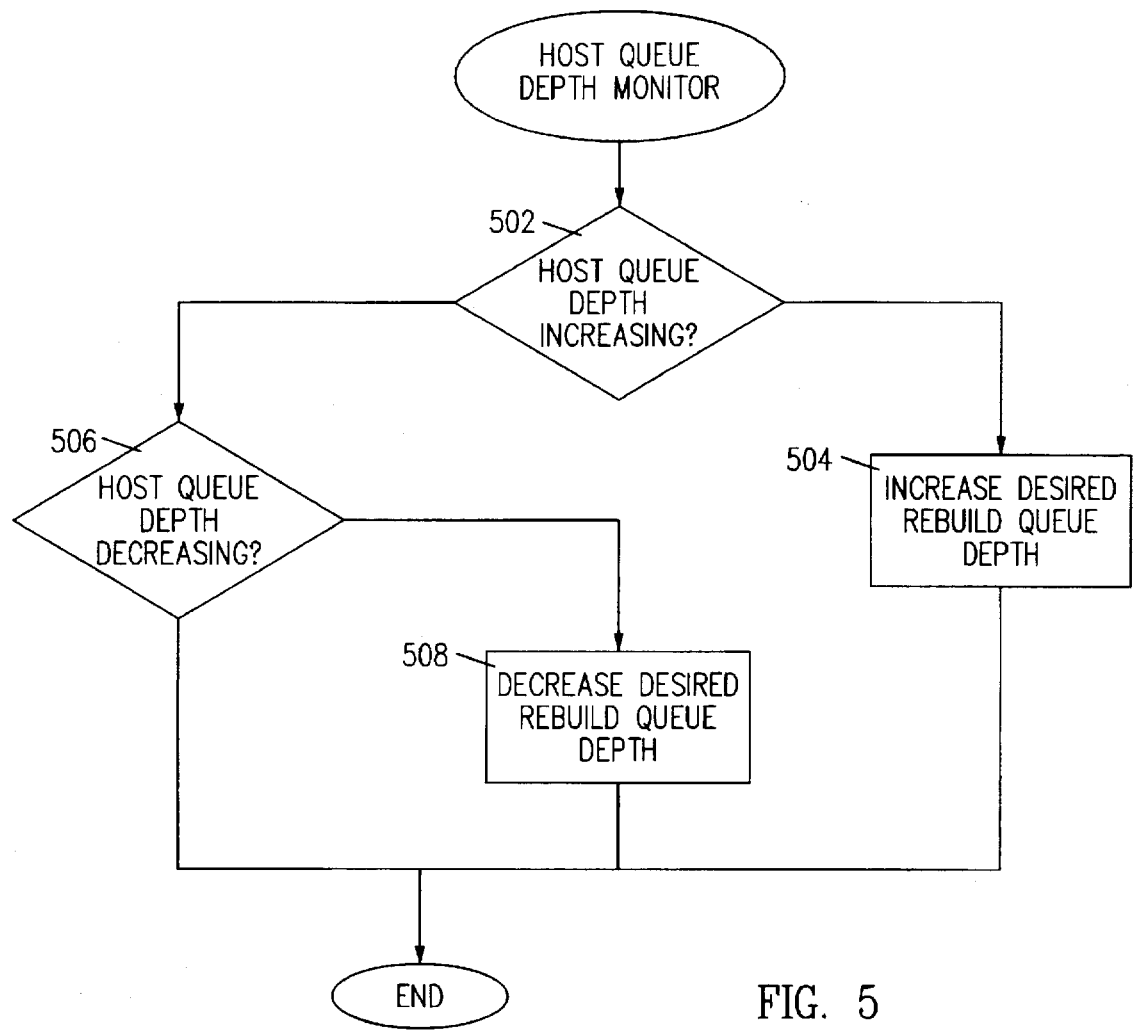
FIG. 5 is a flowchart diagram illustrating operation of a host queue depth monitor according to the present invention.

Referring now to FIG. 5, the Rebuild Task preferably includes a Host Queue Depth Monitor which monitors host queue depth, i.e., the number of host requests in the execution queue. The Host Queue Depth Monitor is preferably invoked after each rebuild request has completed. Alternatively, the Host Queue Depth Monitor is periodically invoked at preset intervals based on a timer. When the Host Queue Depth Monitor is invoked, the Host Queue Depth Monitor first determines in step 502 whether the host queue depth is increasing. In the preferred embodiment, the Host Queue Depth Monitor also determines the actual size of the host queue depth. If the host queue depth is determined to be increasing in step 502, then in step 504, the Host Queue Depth Monitor increases a variable referred to as Desired Rebuild Queue Depth. The Host Queue Depth Monitor preferably increases the Desired Rebuild Queue Depth variable proportionately to the increase in the host queue depth. Operation then completes. If the Host Queue Depth Monitor determines if the host queue depth is decreasing in step 506, then in step 508, the Host Queue Depth Monitor decreases the Desired Rebuild Queue Depth variable proportionately.

In one embodiment of the invention, the Host Queue Depth Monitor simply makes a binary determination as to whether the host queue depth is increasing or decreasing, and increases or decreases the Desired Rebuild Queue Depth variable by a preset amount. In the preferred embodiment of the invention, the Host Queue Depth Monitor determines the actual amount of increase or decrease in the host queue depth and proportionately increases or decreases the Desired Rebuild Queue Depth variable to either match the current host queue depth or maintain the Desired Rebuild Queue Depth variable proportionate to the current host queue depth. If the host queue depth is determined to have remained constant, then the Host Queue Depth Monitor does not adjust the Desired Rebuild Queue Depth variable, and operation completes.

Rebuild Task

Figure 6:
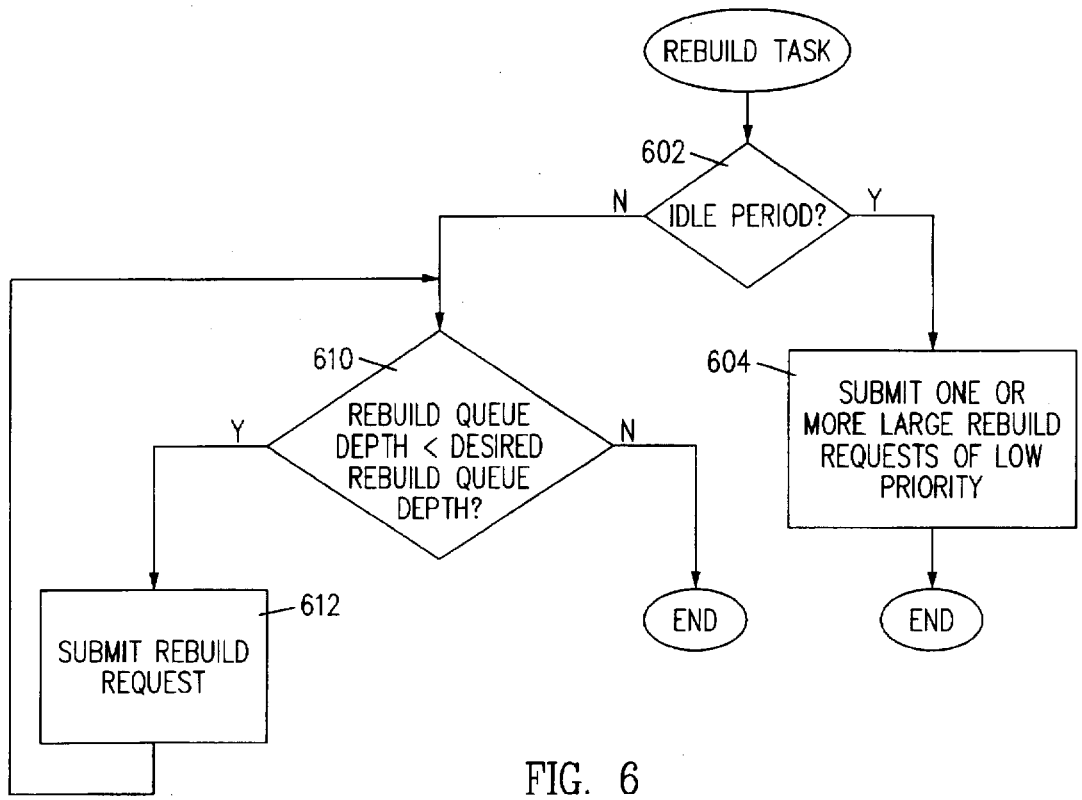
FIG. 6 is a flowchart diagram illustrating operation of the rebuild task according to the present invention.

Referring now to FIG. 6, a flowchart diagram is shown illustrating operation of the Rebuild Task during data reconstruction operations. In step 602 the Rebuild Task determines if an idle period exists in disk controller activity. If so, then in step 604 the Rebuild Task submits one or more large rebuild requests of low priority to the execution queue. The rebuild requests are low priority so that, if a host request is submitted, the host request will have a higher priority and will be immediately executed. Thus, during idle periods, reconstruction is accomplished by creating relatively large, low priority rebuild requests and queueing one or two of these requests at a time. When the host CPU submits a request, the host request can be processed quickly, since the host request has a higher priority and there is not a backlog of rebuild requests to complete. This is similar to the operation of the disk controller disclosed in U.S. Pat. No. 5,313,626 discussed above.

If this is not an idle period of disk activity, i.e., one or more host command requests are queued, then in step 610 the Rebuild Task compares the actual rebuild queue depth with the Desired Rebuild Queue Depth variable adjusted by the Host Queue Depth Monitor in FIG. 5. In step 610 the Rebuild Task determines if the current rebuild queue depth is less than the Desired Rebuild Queue Depth variable. If so, then the Rebuild Task submits a rebuild request to the execution queue in step 612 and then returns to step 610. This process preferably continues until the number of rebuild requests in the execution queue is approximately equal to the number of host requests in the execution queue. If the current rebuild queue depth is greater than or equal to the Desired Rebuild Queue Depth variable in step 610, then no rebuild requests are submitted and operation completes.

In step 612 the Rebuild Task creates a rebuild request of a certain size and submits this rebuild request to the execution queue. In the preferred embodiment of the invention, the disk controller 122 allows the user to specify an amount of disk array bandwidth to be used by the controller 122 for the rebuild or reconstruction process, and this specified bandwidth determines the maximum degradation acceptable to the user's application. In step 612 the Rebuild Task preferably creates a rebuild request having a size based on the current number of rebuild requests in the queue and the user-specified amount of disk array bandwidth to be used by the controller 122 for the rebuild process. In other words, the Rebuild Task submits a rebuild request of a specified size based on the current rebuild request queue depth to maintain the user specified level of bandwidth allotted for data reconstruction operations. Thus, as the Desired Rebuild Queue Depth variable increases, the rebuild request size correspondingly decreases, and vice-versa, to essentially maintain a constant ratio of the product of these two variables.

Therefore, the Rebuild Task in conjunction with the Host Queue Depth Monitor dynamically monitors the host command queue depth during the rebuild process and dynamically adjusts the number of rebuild requests to approximately equal or maintain a constant proportion to the number of host requests in the queue. The Rebuild Task preferably queues an appropriate number of rebuild requests of varying size so that neither requesting task dominates. This compensates for times when the host queues request deeply, such as during write cache flushing. The method of the present invention also preserves responsiveness when the host has only a single threaded activity, such as a drive format or mount.

Multi-Level Queues

Figure 7:
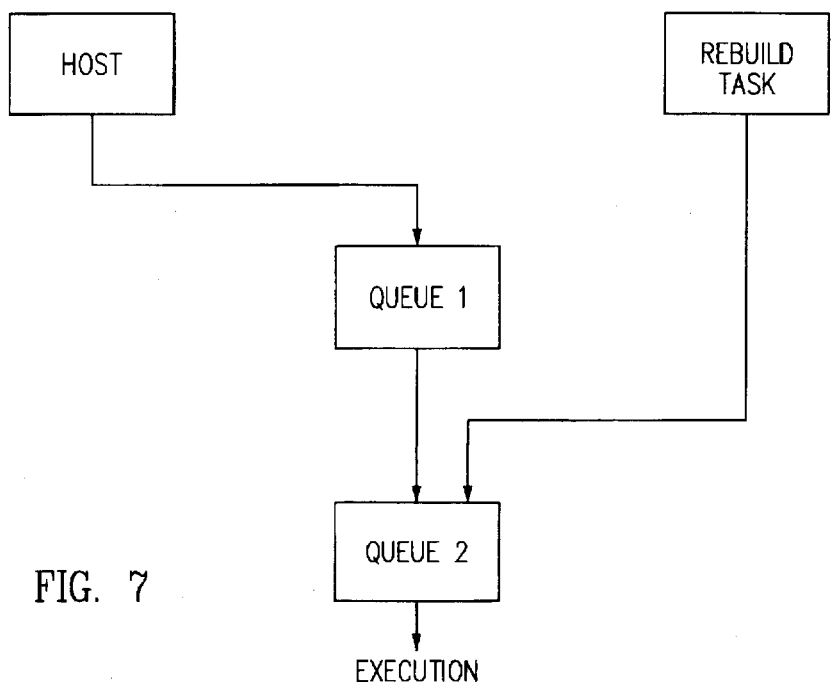
FIG. 7 illustrates a request queue configuration using multi-level queues to filter out host command queue depth variations according to one embodiment of the present invention.

Referring now to FIG. 7, an alternate and preferred embodiment of the present invention is shown using a multiple level execution queue which also serves to dynamically compensate for the host command queue depth during the rebuild process. As shown in FIG. 7, in this presently preferred embodiment the disk controller 122 preferably includes a first queue referred to as queue 1, which is a relatively deep queue, and a second intermediate queue referred to as queue 2, which is a relatively shallow queue. As shown, host requests are provided to queue 1 and ultimately filter down to queue 2 before execution. In contrast, the Rebuild Task provides rebuild requests directly to queue 2. The command queue depth of queue 2 is purposefully limited to very few requests, i.e., is a shallow queue. Thus queue 2 generally always has an equal or proportionate number of host requests and rebuild requests, regardless of the number of host requests being submitted. Accordingly, the variation in command queue depth of host requests is filtered out by the deeper queue 1, and thus performance degradation is more consistently controlled.

In this embodiment, the Rebuild Task preferably comprises a portion of the software task which processes the request queues, i.e., queue 1 and queue 2. Thus, according to this embodiment, no special software tasks are required to compensate for queue depth or to synchronize access to the second level queue.

Conclusion

Therefore, the present invention comprises a disk controller and method which dynamically compensates for the host command queue depth during data reconstruction operations. The disk controller thus maintains a predictable level of degradation during reconstruction operations while also guaranteeing a specified completion time.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for maintaining predictable performance of a disk array system during data reconstruction operations under varying disk loads, wherein the disk array system comprises a disk controller and a disk array coupled to the disk controller, wherein the disk array comprises a plurality of disk drives, wherein when a new drive is inserted in the disk array, the disk controller performs data reconstruction operations to place data on the new drive, the method comprising the steps of:

receiving one or more requests from a host, wherein said host requests comprise reads or writes of data on the disk array, wherein said one or more host requests are stored on an execution queue for execution;

determining a number of said host requests on said execution queue;

creating one or more rebuild requests to rebuild data on the new drive;

placing a number of said rebuild requests on said execution queue, wherein said number of said rebuild requests placed on said execution queue is determined in response to said step of determining said number of said host requests on said execution queue, wherein said step of placing places said number of said rebuild requests on said execution queue to dynamically compensate for said number of host requests on said execution queue, and receiving a user-specified amount of disk array bandwidth to be used by the disk controller for said data reconstruction operations, wherein said step of creating said one or more rebuild requests includes creating said rebuild requests of a certain size based on said determined number of host requests on said execution queue and said user-specified amount of disk array bandwidth to be used for said reconstruction operations.

2. The method of claim 1, further comprising:

repeatedly performing said steps of determining said number of host requests on said execution queue, creating one or more rebuild requests to rebuild data on the new drive, and placing said number of said rebuild requests on said execution queue until said data reconstruction operations have completed on said new drive.

3. The method of claim 1, further comprising:

executing said number of said host requests and said number of said rebuild requests on said execution queue, wherein execution of said number of said rebuild requests results in a predictable level of degradation to execution of said number of said host requests.

4. The method of claim 3, further comprising:

repeatedly performing said steps of determining said number of host requests on said execution queue, creating one or more rebuild requests to rebuild data on the new drive, placing said number of said rebuild requests on said execution queue, and executing said number of said host requests and said number of said rebuild requests until said data reconstruction operations have completed on said new drive;

wherein said disk array system maintains a predictable level of performance of said host requests during said step of repeatedly performing.

5. The method of claim 1, wherein said step of placing comprises placing said number of said rebuild requests on said execution queue to maintain an approximately constant proportion of said number of said rebuild requests to said determined number of said host read requests on said execution queue, wherein execution of said rebuild requests results in a predictable level of degradation to execution of said host requests.

6. The method of claim 1, wherein said step of receiving said one or more host requests receives a varying load of host requests from said host over time.

7. The method of claim 1, further comprising:
adjusting a Desired Rebuild Queue Depth variable in response to said step of determining said number of host requests on said execution queue;
wherein said step of placing comprises:
examining said Desired Rebuild Queue Depth variable; and
placing a number of said rebuild requests on said execution queue based on said Desired Rebuild Queue Depth variable.

8. The method of claim 7, wherein said step of determining said number of host requests on said execution queue determines if host queue depth is increasing, wherein said step of adjusting said Desired Rebuild Queue Depth variable further comprises:
increasing said Desired Rebuild Queue Depth variable if said host queue depth is increasing; and
decreasing said Desired Rebuild Queue Depth variable if said host queue depth is decreasing.

9. The method of claim 1, further comprising the steps of:
a disk drive failing in the disk array; and
replacing said failed disk drive with the new drive prior to said step of creating said plurality of rebuild requests.

10. A disk array system which maintains predictable performance during data reconstruction operations under varying disk loads, comprising:
a disk array comprising a plurality of disk drives, said plurality of disk drives including a new drive;
an execution queue for storing data requests for said disk array; and
a disk controller coupled to said execution queue and said disk array which performs data reconstruction operations to place data on the new drive in said disk array, wherein the disk controller comprises:
means for receiving one or more requests from a host, wherein said host requests comprise reads or writes of data on the disk array, wherein said receiving means places said one or more host requests on said execution queue for execution;
means for determining a number of host requests on said execution queue;
means for creating a plurality of rebuild requests to rebuild data on the new drive;
means for placing a number of said rebuild requests on said execution queue, wherein said means for placing places said number of said rebuild requests on said execution queue to dynamically compensate for said number of host requests on said execution queue; and
means for receiving a user-specified amount of disk array bandwidth to be used by the disk controller for said data reconstruction operations, wherein said means for creating said one or more rebuild requests creates said rebuild requests of a certain size based on said determined number of host requests on said execution queue and said user-specified amount of disk array bandwidth to be used for said reconstruction operations.

11. The disk array system of claim 10, wherein the disk controller further comprises:
means for executing said number of said host requests and said number of said rebuild requests on said execution queue, wherein execution of said number of said rebuild requests results in a predictable level of degradation to execution of said number of said host requests.

12. The disk array system of claim 11, wherein said means for determining, said means for creating, said means for placing, and said means for executing repeatedly operate in said disk controller until said data reconstruction operations have completed on said new drive;
wherein said disk array system maintains a predictable level of performance of said host requests during said data reconstruction operations.

13. The disk array system of claim 10, wherein said means for placing in said disk controller places said number of said rebuild requests on said execution queue to maintain an approximately constant proportion of said number of said rebuild requests to said determined host requests on said execution queue, wherein execution of said rebuild requests results in a predictable level of degradation to execution of said host requests.

14. A disk array system which maintains predictable performance during data reconstruction operations under varying disk loads, comprising:
a disk array comprising a plurality of disk drives, said plurality of disk drives including a new drive;
an execution queue for storing data requests for said disk array; and
a disk controller coupled to said execution queue and said disk array which performs data reconstruction operations to place data on the new drive in said disk array, wherein the disk controller comprises:
means for receiving one or more requests from a host, wherein said host requests comprise reads or writes of data on the disk array, wherein said receiving means places said one or more host requests on said execution queue for execution;
means for determining a number of host requests on said execution queue;
means for creating a plurality of rebuild requests to rebuild data on the new drive;
means for placing a number of said rebuild requests on said execution queue, wherein said means for placing places said number of said rebuild requests on said execution queue to dynamically compensate for said number of host requests on said execution queue, and
a memory including one or more bits for storing a Desired Rebuild Queue Depth variable;
wherein the disk controller further comprises:
means for adjusting said Desired Rebuild Queue Depth variable based on said determination of said number of host requests on said execution queue;
wherein said means for placing comprises:
means for examining said Desired Rebuild Queue Depth variable; and
means for placing a number of said rebuild requests on said execution queue based on said Desired Rebuild Queue Depth variable.

15. The disk array system of claim 14, wherein said means for determining said number of host requests on said execution queue determines if host queue depth is increasing, wherein said means for adjusting said Desired Rebuild Queue Depth variable comprises:

means for increasing said Desired Rebuild Queue Depth variable if said host queue depth is increasing; and means for decreasing said Desired Rebuild Queue Depth variable if said host queue depth is decreasing.

16. A method for maintaining predictable performance of a disk system during data reconstruction operations under a wide variety of disk loads, wherein the disk system comprises a disk controller and a disk array coupled to the disk controller, wherein the disk controller comprises a plurality of disk drives, wherein when a new drive is inserted in the system, the disk controller performs data reconstruction operations to place data on the new drive, the method comprising the steps of:

receiving one or more requests from a host, wherein said host requests comprise reads or writes of data on the disk array;

placing said one or more host requests on a first queue, wherein said first queue has a first depth;

transferring said one or more host requests from said first queue to a second queue, wherein said second queue has a second depth less than said first depth creating one or more rebuild requests to rebuild data on the new drive;

placing one or more of said rebuild requests directly on said second queue; and executing said one or more host requests and said one or more rebuild requests from said second queue, wherein execution of said one or more rebuild requests results in a predictable level of degradation to execution of said one or more host requests.

17. The method of claim 16, wherein said step of placing comprises placing a number of said rebuild requests on said second queue to maintain an approximately constant proportion of said rebuild requests to said host requests on said second queue, wherein execution of said number of said rebuild requests results in a predictable level of degradation to execution of said host requests.

18. The method of claim 16, further comprising:

repeatedly performing said steps of placing said one or more host requests on said first queue, transferring said one or more host requests from said first queue to said second queue, creating one or more rebuild requests to rebuild data on the new drive, placing one or more of said rebuild requests directly on said second queue, and executing said one or more host requests and said one or more rebuild requests until said data reconstruction operations have completed on said new drive;

wherein said disk array system maintains a predictable level of performance of said host requests during said step of repeatedly performing.

19. The method of claim 16, further comprising:

receiving a user-specified amount of disk array bandwidth to be used by the disk controller for said data reconstruction operations, wherein said step of creating said one or more rebuild requests includes creating said rebuild requests of a certain size based on said user-specified amount of disk array bandwidth to be used for said reconstruction operations.

20. The method of claim 16, wherein said step of receiving receives a varying load of host requests from said host.

21. A disk array system which maintains predictable performance during data reconstruction operations under varying disk loads, comprising:

a disk array comprising a plurality of disk drives, said plurality of disk drives including a new drive;

a first queue for storing host requests for said disk array, wherein said first queue has a first size;

a second queue for storing host requests and rebuild requests, wherein said second queue has a second size less than said first size, wherein host requests propagate from said first queue to said second queue prior to execution; and a disk controller coupled to said first and second queues and said disk array which performs data reconstruction operations to place data on the new drive in said disk array, wherein the disk controller comprises:

means for receiving one or more requests from said host, wherein said host requests comprise reads or writes of data on the disk array;

means for placing said one or more host requests on said first queue;

means for transferring said one or more host requests from said first queue to said second queue;

means for creating one or more rebuild requests to rebuild data on the new drive;

means for placing one or more of said rebuild requests directly on said second queue; and means for executing said one or more host requests and said one or more rebuild requests from said second queue, wherein execution of said one or more rebuild requests results in a predictable level of degradation to execution of said one or more host requests.

22. The disk array system of claim 21, wherein said means for placing places a number of said rebuild requests on said second queue to maintain an approximately constant proportion of said rebuild requests to said host requests on said second queue, wherein execution of said number of said rebuild requests results in a predictable level of degradation to execution of said host requests.

23. The disk array system of claim 21, further comprising:

wherein said means for placing said one or more host requests on said first queue, said means for transferring said one or more host requests from said first queue to said second queue, said means for creating one or more rebuild requests to rebuild data on the new drive, said means for placing one or more of said rebuild requests directly on said second queue, and said means for executing said one or more host requests and said one or more rebuild requests repeatedly operate until said data reconstruction operations have completed on said new drive;

wherein said disk array system maintains a predictable level of performance of said host requests during said data reconstruction operations.

* * * * *